(12) United States Patent
Luke et al.

(10) Patent No.: US 11,733,620 B2
(45) Date of Patent: Aug. 22, 2023

(54) PRINT POWDER RESERVOIR SEALED FROM ATMOSPHERE AT LOWER PRESSURE THAN ATMOSPHERE

(71) Applicant: Hewlett-Packard Development Company, L.P., Spring, TX (US)

(72) Inventors: Jeffrey Harold Luke, Boise, ID (US); Gabriel Scott McDaniel, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/286,887

(22) PCT Filed: Nov. 9, 2018

(86) PCT No.: PCT/US2018/059949
§ 371 (c)(1),
(2) Date: Apr. 20, 2021

(87) PCT Pub. No.: WO2020/096610
PCT Pub. Date: May 14, 2020

(65) Prior Publication Data
US 2021/0382413 A1 Dec. 9, 2021

(51) Int. Cl.
  *G03G 15/08* (2006.01)
  *G03G 21/18* (2006.01)
  *G03G 21/20* (2006.01)
(52) U.S. Cl.
  CPC ..... *G03G 15/0881* (2013.01); *G03G 15/0884* (2013.01); *G03G 15/0886* (2013.01); *G03G 15/0896* (2013.01); *G03G 15/0898* (2013.01); *G03G 21/181* (2013.01); *G03G 21/1814* (2013.01); *G03G 21/1821* (2013.01);
  (Continued)

(58) Field of Classification Search
  CPC .......... G03G 15/0881; G03G 15/0884; G03G 15/0886; G03G 15/0887; G03G 15/0889; G03G 15/0896; G03G 15/0898; G03G 21/181; G03G 21/1814; G03G 21/1828; G03G 21/206; G03G 2215/08; G03G 2215/0802; G03G 2215/0855; G03G 2215/0872; G03G 2215/0877
  See application file for complete search history.

(56) References Cited

U.S. PATENT DOCUMENTS

| 4,895,034 A | 1/1990 | Poole |
| 5,035,364 A | 7/1991 | Escallon |
| 5,522,555 A | 6/1996 | Poole |

(Continued)

FOREIGN PATENT DOCUMENTS

| EP | 2 416 222 A1 | 2/2012 |
| JP | 2000-313402 A | 11/2000 |

(Continued)

OTHER PUBLICATIONS

Kanba et al. (JP 2017-044880A) Published Mar. 2, 2017.*

*Primary Examiner* — Joseph S Wong
(74) *Attorney, Agent, or Firm* — Foley & Lardner LLP

(57) ABSTRACT

A print material cartridge may include a hopper to maintain an amount of print material therein; and an atmospheric pressure seal to seal the hopper from atmosphere; wherein a pressure within the hopper and sealed by the atmospheric pressure seal is lower than atmosphere.

15 Claims, 5 Drawing Sheets

(52) U.S. Cl.
CPC ....... *G03G 21/1828* (2013.01); *G03G 21/206* (2013.01); *G03G 2215/0877* (2013.01)

(56) References Cited

U.S. PATENT DOCUMENTS

| | | |
|---|---|---|
| 6,088,552 A | 7/2000 | Morinaga et al. |
| 6,665,505 B2 | 12/2003 | Meetze, Jr. et al. |
| 7,037,382 B2 | 5/2006 | Davidson et al. |
| 2005/0265751 A1 | 12/2005 | Nakazato et al. |
| 2008/0006334 A1 | 1/2008 | Davidson et al. |

FOREIGN PATENT DOCUMENTS

| | | |
|---|---|---|
| JP | 2007-331770 A | 12/2007 |
| WO | WO-2013/039941 A1 | 3/2013 |
| WO | WO-2018/054728 A1 | 3/2018 |

\* cited by examiner

PRINT POWDER RESERVOIR SEALED FROM ATMOSPHERE AT LOWER PRESSURE THAN ATMOSPHERE

BACKGROUND

Toner cartridges provide a source of toner to a printing device. The toner may be any type of toner that may be used to develop an image on the surface of a sheet of media or a three-dimensional (3D) object. In either example, a toner cartridge may be selectively interfaced with the printing device in order to be used as the source of the toner to the printing device.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
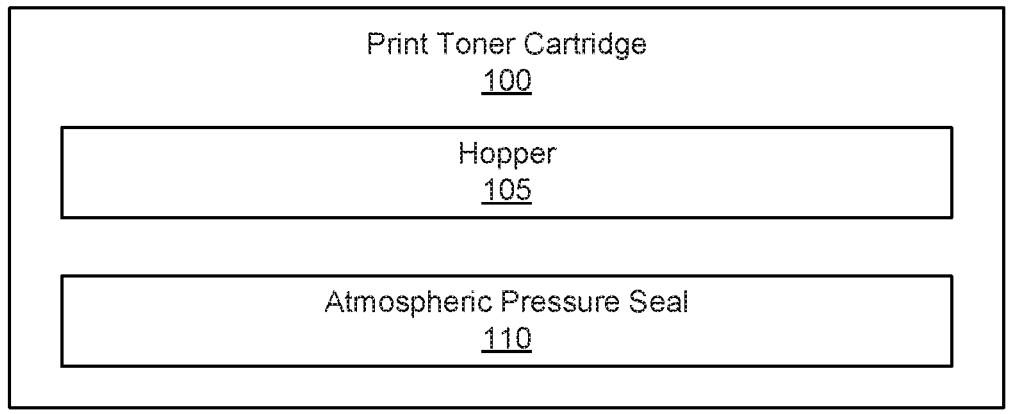
FIG. 1 is a block diagram of a print powder cartridge according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Toners and other powders may be used to develop two-dimensional (2D) images on a sheet of media and/or develop three-dimensional (3D) objects using a printing device. The toners and powders (referred herein as toners) may be introduced to the printing device using a cartridge or other type of container used to maintain an amount of print material or powder therein. The cartridge may provide a continuous amount of toner to the printing device so that the images or objects may be formed.

Because the toner is in powder form, the small particles of the toner may clump together. This may be due to a number of factors including compaction of the toner within the toner cartridge during transport and gravity, among others. The flowability of the toner from the toner cartridge to the printing device may result in improper functioning of the toner cartridge and/or printing device. The may lead to print defects on the print media, toner level sensor failures, excessive torque on motors within the printing device, and/or mechanical failure of stirring mechanisms used to stir the toner within the toner cartridge and/or printing device.

In order to rectify the clumping of the toner within the cartridge, a user may shake the cartridge. By shaking the cartridge, a user is attempting to loosen the clumps of toner formed within the cartridge by breaking the clumps of toner apart against the interior walls of the cartridge. During a shaking process by the user, the toner may leak from the cartridge and may cause damage to or soil other components of the printing device and/or other objects at or around the user or printing device. Additionally, this is a step implemented by a user which could be avoided if the clumps where not formed at all or if the clumps where broken apart using another method apart from user interaction. Still further, by shaking the toner cartridge in order to break up the clumps and increase flowability of the toner, the user may damage the cartridge also potentially resulting in damage to the printing device when the cartridge is again introduced with the printing device.

The present specification describes a print powder cartridge that includes a hopper to maintain an amount of print powder therein and an atmospheric pressure seal to seal the hopper from atmosphere; wherein a pressure within the hopper and sealed by the atmospheric pressure seal is lower than atmosphere.

The present specification also describes a method of aerating a print powder that includes creating a below-atmosphere pressure within a print powder reservoir of a print cartridge; sealing the print powder reservoir with a seal; and eliminating the seal to aerate a print powder maintained within the print powder reservoir.

The present specification further describes a print toner cartridge that includes a print toner reservoir to receive an amount of powder toner therein; a seal to seal the print toner reservoir from atmosphere; and an atmospheric reduction device to reduce the atmospheric pressure within the print toner reservoir after the seal has sealed the toner within the print toner reservoir.

Turning now to the figures, FIG. 1 is a block diagram of a print toner cartridge (100) according to an example of the principles described herein. The print toner cartridge (100) may be any type of container that may maintain an amount of print material therein. In an example, the print material may be any type of material that may be used to develop or create a 2D image on a sheet of media and/or a 3D object using, for example, a 3D printer. Examples of print material maintained within the print toner cartridge (100) may include any powder or particle mixture that may be manipulated by a printing device. The manipulation of the powders or particles may include electrostatic, thermal, smearing, and mechanical processes, among other types of processes executed by a printing device.

The print toner cartridge (100) may be made of any material that may hold the print material therein and be rigid enough to resist pressure higher than atmospheric pressure when subjected to, for example, a vacuum. These materials may include plastics and/or metals or any other type of air non-permeable material. The print toner cartridge (100) may also, in an example, include internal mechanisms to transport the print material from a hopper (105) within the print toner cartridge (100) out of the print toner cartridge (100) and to the printing device. Although the present specification may not describe these internal mechanisms, the present specification contemplates any use of any internal mechanism within the print toner cartridge (100) that conveys or helps to convey the print material to a print media or print location.

The print toner cartridge (100) may include a hopper (105) to hold and maintain an amount of print material therein. The hopper (105) may include any stirring mechanism that stirs the print material therein so as to maintain the flowability of the print material therein. These stirring mechanisms may be, when the print toner cartridge (100) is interfaced with a printing device, driven by a motor within the printing device.

The print toner cartridge (100) may include an atmospheric pressure seal (110). The atmospheric pressure seal (110) may seal the print material within the hopper (105) of the print toner cartridge (100) prior to use of the print toner cartridge (100) in a printing device. In an example, the atmospheric pressure seal (110) may seal off a print material exit formed within the hopper (105) from atmosphere. The atmospheric pressure seal (110) may be made of any type of material that may be resilient enough to withstand a pressure difference between an interior portion of the hopper (105) and atmosphere. In an example the atmospheric pressure seal (110) may be made of a plastic, metal, composite materials, or polymer film. The hopper (105), once sealed or as it is sealed with the atmospheric pressure seal (110), may have a pressure that is lower than atmosphere. As described herein, once the pressure difference between atmosphere and the internal portion of the hopper (105) has been created, removal of the atmospheric pressure seal (110) may cause an inrush of air into the hopper (105) of the print toner cartridge (100). With sufficient pressure differentiation between atmosphere and the internal portion of the hopper (105), the inrush of air into the hopper (105) may churn the print material maintained therein so as to break apart clumps of print material that may have formed and aerate the print material. As such, even prior to use of the print material within the print toner cartridge (100) by a printing device, any clumps that may have formed within the print material may be broken up so that by interfacing the print toner cartridge (100) with the printing device may be sufficient to assure the flowability of the print material during a printing process. This reduces down time of the printing device, damage to the printing device and/or print toner cartridge (100), and user interaction with the printing device and/or print toner cartridge (100) during the lifetime of the print toner cartridge (100).

In an example, upon interfacing of the print toner cartridge (100) into a printing device, the atmospheric pressure seal (110) may be separated, removed pierced, or otherwise eliminated. The elimination of the atmospheric pressure seal (110) from the print material exit of the hopper (105) may or may not include user interaction. In the example where user interaction is implemented, a tab may be formed on the atmospheric pressure seal (110) so that a user may pull the tab causing the atmospheric pressure seal (110) to be removed from the print material exit of the hopper (105). Similarly, and in the example where the print device is used to remove the atmospheric pressure seal (110), the tab may be mechanically pulled by a device within the printing device. In an example where the printing device is used to remove the atmospheric pressure seal (110), the printing device may puncture the atmospheric pressure seal (110) causing the inrush of air into the hopper (105) to break the entirety of the atmospheric pressure seal (110). The puncture of the atmospheric pressure seal (110) may be localized at any location or region along the atmospheric pressure seal (110) or may be accomplished by rupturing the entirety of the atmospheric pressure seal (110).

During operation of the printing device and once the print toner cartridge (100) has been interfaced with a printing device, the printing device may access the atmospheric pressure seal (110) and remove the atmospheric pressure seal (110) from the print material exit formed on the hopper (105). As described herein, the difference in pressure between atmosphere and the internal portion of the hopper (105), causes air to pass, relatively quickly, into the internal portion of the hopper (105) so as to cause any clumps of print material to be tossed about, allowing air to permeate in between the particles of the print material within the hopper (105), and/or otherwise break up the clumps. In an example, the exit of the hopper (105) at which the atmospheric pressure seal (110) is placed may be so formed so as to create the most or strongest inrush of air into the hopper (105) once the atmospheric pressure seal (110) is created. In this example, the criteria to create the inrush of air into the hopper (105) using the print material exit of the hopper (105) may include the a vacuum pressure maintained within the hopper (105), an atmospheric pressure outside of the hopper (105), the volume of the hopper (105) and its vacuum pressure therein, the direction of the air into the hopper (105), the force of the air against the print material, and the anticipated size of the clumps of print material, among other criteria.

Formation of the pressure differential between the interior portion of the hopper (105) and atmosphere may be accomplished using any process. In an example, the print toner cartridge (100) may be placed within a vacuum chamber. In this example, print material may be added to the interior of the hopper (105) and the print material exit may be sealed by the atmospheric pressure seal (110). The print toner cartridge (100) may be removed from the vacuum chamber causing the pressure differentiation to be created between atmosphere and the internal portion of the hopper (105).

In an example, the pressure differentiation between the interior portion of the hopper (105) and atmosphere may be accomplished through the use of a valve formed between the interior portion of the hopper (105) and an exterior wall of the hopper (105). In this example, the valve may be a one-way valve such that air within the hopper (105) may be removed and no air is allowed to pass back into the hopper (105) when evacuated. In this example, the atmospheric pressure seal (110) may be placed on the print material exist of the hopper (105) after an amount of print material has been put within the hopper (105). A vacuum pump may be coupled to the valve so as to remove an amount of air within the sealed hopper (105). The vacuum pump may include a filter so that the pump does not intake an amount of print material from the hopper (105). In an example, the valve itself may include the filter so that no print material will be removed from the print toner cartridge (100).

In an example, the pressure differentiation between the interior portion of the hopper (105) and atmosphere may be accomplished through the use of a moveable wall within the hopper (105). In this example, the hopper (105) may include a wall that may be moved so as to increase the volume of the hopper (105). In this example, the atmospheric pressure seal (110) may be coupled to the print material exit after the hopper (105) has been filled with the print material. In order to create the differentiation in pressure, the moveable wall may be moved so as to expand the volume of the hopper (105). Because the atmospheric pressure seal (110) has been put in place, the increase in volume with in the hopper (105) creates a pressure within the hopper (105) lower than atmosphere. In this way, removal of the atmospheric pressure seal (110) may cause air to rush into the hopper (105) to fill the volume within the hopper (105) that was created by the moveable wall. In any example, the movable wall may be moved using any mechanical device or by a user. In an example, the moveable wall may be accomplished any time prior to the removable of the atmospheric pressure seal (110). In such an example, interfacing of the print toner cartridge (100) with a printing device may cause the expandable wall to be moved via, for example, a mechanical interface.

Figure 2:
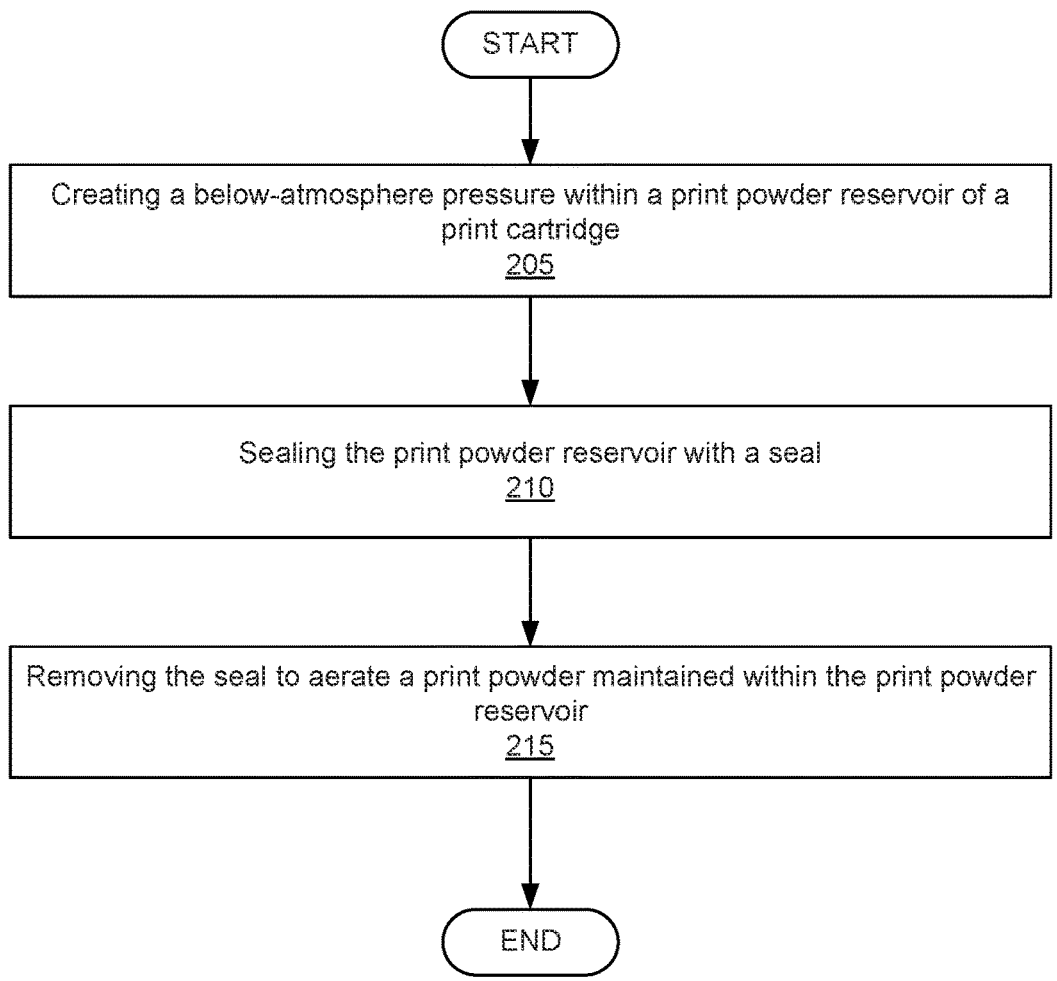
FIG. 2 is a flowchart showing a method of aerating a print powder according to an example of the principles described herein.

FIG. 2 is a flowchart showing a method (200) of aerating a print powder according to an example of the principles described herein. In the present specification and in the appended claims, the term "aeration" is to be understood as the exposure to the action or effect of air or to cause air to circulate about an object. In these examples, therefore, the print powder within a hopper (105) may be aerated via exposure of air and in specific examples by a inrush of air into the hopper (105). Throughout the present specification and in the appended claims, the term print material may be used interchangeably with the term print powder or print toner. The term print material is referenced to include both print powders and print toners. Additionally, reference to a print "material" reservoir is meant to encompass a reservoir that maintains a print powder (i.e., print powder reservoir) and/or a print toner (i.e., a print toner reservoir). Thus, in every instance of a material being described may refer to a toner, a three-dimensional (3D) build material, and/or other powder materials used to form a two-dimensional image on a media and/or a 3D object on a substrate.

The method (200) may include creating (205) a below-atmosphere pressure within a print material reservoir of a print toner cartridge (100). In an example the print material reservoir may be the hopper (105) as described in connection with FIG. 1. The creation (205) of the below-atmosphere pressure within a print material reservoir may include a number of processes as described herein. In an example, the creation (205) of the below-atmosphere pressure within a print material reservoir may include the removal of air from the interior of the print material reservoir via a pump attached to a valve fluidically coupling an interior of the print material reservoir to an exterior of the print material reservoir. In this example, the valve may be a one-way valve that prevents air from reentering the print material reservoir but allows air to be pumped out. In an example, the valve may include a filter to prevent any print material within the print material reservoir from being pumped out when the air is removed from the print material reservoir. In an example, the creation (205) of the below-atmosphere pressure within a print material reservoir includes placing the seal over a print material exit of the print material reservoir thereby sealing (210) the print material reservoir with the seal.

In an example, the creation (205) of the below-atmosphere pressure within a print material reservoir may include placing the print cartridge such as the print toner cartridge (100) of FIG. 1 within a vacuum chamber. This may be done prior to sealing (210) the print material reservoir with a seal. In this example, after the print cartridge has been placed in a vacuum chamber, the print material reservoir may be filled with print material and the print material reservoir may be sealed (210) with the seal such as the atmospheric pressure seal (110) descried in connection with FIG. 1.

In an example, the creation (205) of the below-atmosphere pressure within a print material reservoir may be accomplished by a movable wall within the print material reservoir. In this example, the print material reservoir may be filled with print material and a print material exit may be sealed (210) with a seal as described herein. The movable wall may then be moved so as to increase the volume of the print material reservoir causing the pressure within the print material reservoir to drop and become lower than atmospheric pressure outside of the print material reservoir.

The method (200) may include removing (315) the seal to aerate a print material maintained within the print material reservoir. As described herein, the removal of the seal may cause a sudden inrush of air into the print material reservoir so as to aerate and agitate the print material within print material reservoir thereby breaking apart any clumps of print material that may have been formed within the print material reservoir. As described herein, a seal may be removed (215) via any mechanical means either via user interaction or by and as the print cartridge is interfaced with the printing device.

The method (200) may include any additional processes as described herein. These additional processes may include notifying a user, via a graphical user interface of a printing device, the status of the seal relative to the printing cartridge.

Figure 3:
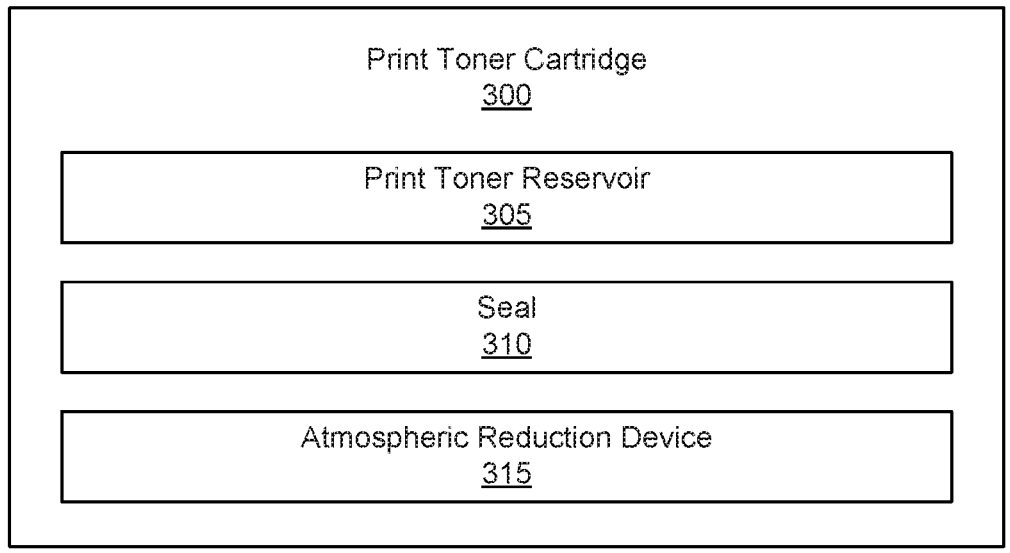
FIG. 3 is a block diagram of a print toner cartridge according to an example of the principles described herein.

FIG. 3 is a block diagram of a print toner cartridge (300) according to an example of the principles described herein. The print toner cartridge (300) may be any type of cartridge that may be selectively coupled to a printing device. In an example, the print toner cartridge (300) may include a print material reservoir (305). The print material reservoir (305) may be of any shape formed within the print toner cartridge (300) and may maintain any amount of print material.

The print toner cartridge (300) may include a seal (310) to seal the print material reservoir (305) from atmosphere. The print material reservoir (305) may include a print material exit from which the print toner cartridge (300) may provide to a printing device an amount of print material. In an example, the seal may be placed over this print material exit so as to prevent the movement of the print material from within the print material reservoir and to a printing device.

The print toner cartridge (300) may include an atmospheric reduction device (315). The atmospheric reduction device (315) may be used to reduce the atmospheric pressure within the print material reservoir after the seal has sealed the powder toner within the print material reservoir. As described herein, the atmospheric reduction device (315) may be integral to the print material reservoir (305). In an example, the atmospheric reduction device (315) may include a one-way valve such that air may be drawn out of the print material reservoir (305) after the seal (310) has sealed the print material reservoir (305) as described herein. In an example, the atmospheric reduction device (315) may be a moveable wall that increases the volume of the print material reservoir (305) after the print material has been placed within the print material reservoir (305) and the print material reservoir (305) has been sealed by the seal (310) as described herein.

Figure 4:
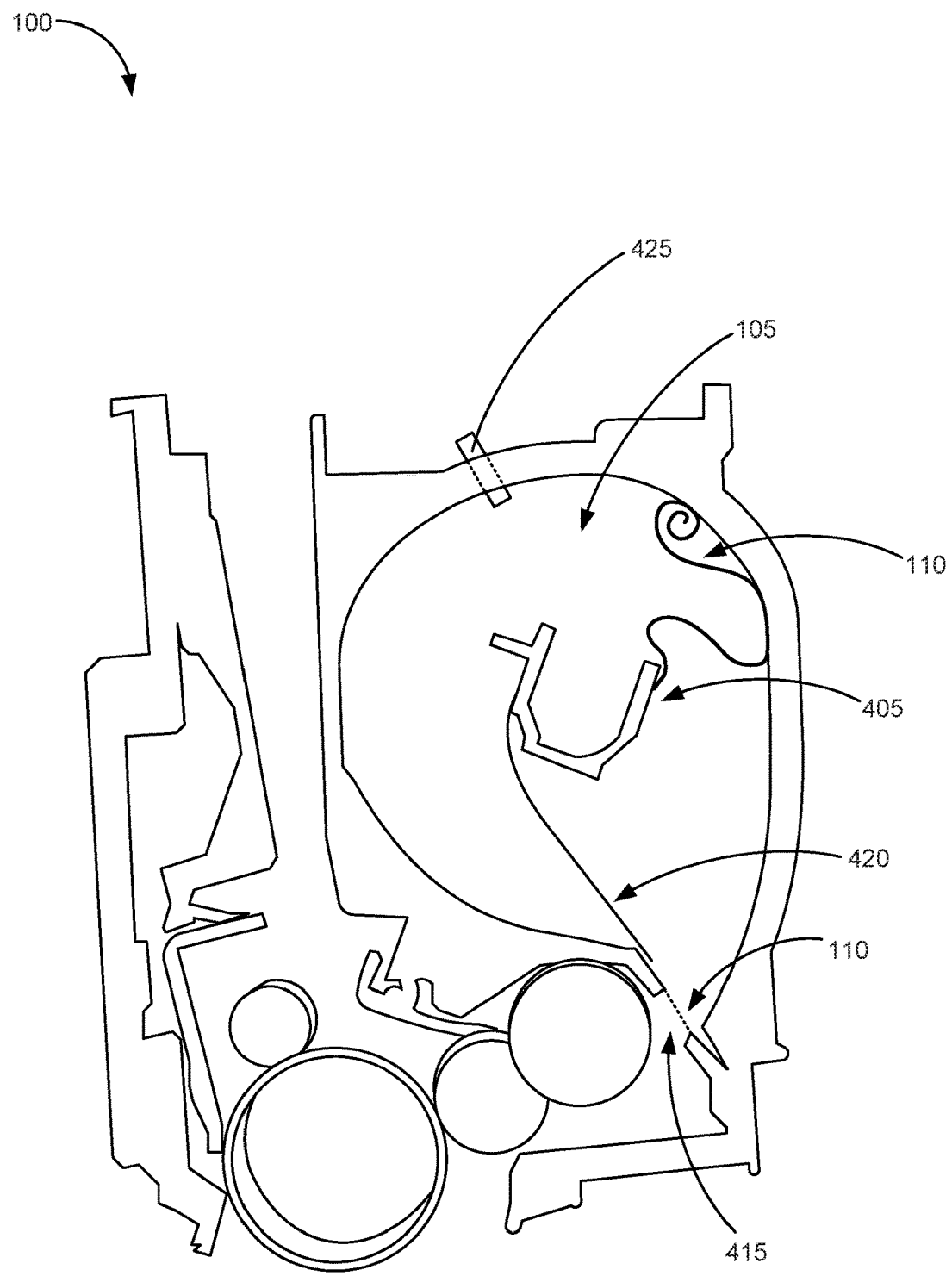
FIG. 4 is a side cutout view of a print material cartridge according to an example of the principles described herein.

FIG. 4 is a side cutout view of a print toner cartridge (100) according to an example of the principles described herein. The print toner cartridge (100), as described herein, may include a hopper (105) that maintains an amount of print material therein during the lifetime of the print toner cartridge (100). In this example, the hopper (105) may be sealed off with an atmospheric pressure seal (110) (shown in dashed lines while in a sealed configuration) that, temporarily, seals the hopper (105) and the print material therein from atmosphere.

In this example, the print toner cartridge (100) may include a stirrer (405). The stirrer (405) may agitate the print material within the hopper (105) after the atmospheric pressure seal (110) has been removed. In this example, the stirrer (405) itself removes the atmospheric pressure seal (110) prior to the print material being provided to a printing device. Specifically, in this example, the stirrer (405) may be mechanically coupled to the atmospheric pressure seal (110) such that during an initial turning of the stirrer (405), the mechanical connection (410) between the stirrer (405) and the atmospheric pressure seal (110) may pull the atmospheric pressure seal (110) away from a print material exit (415) where the atmospheric pressure seal (110) was sealing the hopper (105) and print material from atmosphere. In an example, during operation of the print toner cartridge (100) and after the atmospheric pressure seal (110) has been removed via the stirrer (405), the released atmospheric pressure seal (110) may be used along with other stirring arms (420) to stir the print material. Consequently, this may provide an additional mechanism to stir the print material after the inrush of air has preliminarily broken up any clumps of print material within the hopper (105). The consistent stirring of the print material using the stirrer (405) and stirring arms (420) continuously prevents any clumping of print material throughout the lifetime of the print toner cartridge (100).

Although FIG. 4 shows that activation of the stirrer (405) causes the release of the atmospheric pressure seal (110), the present specification contemplates that any other mechanical device or user interaction may be used to pull the atmospheric pressure seal (110) from the print material exit (415). Thus, in an example, a user may release the atmospheric pressure seal (110) from the print material exit (415) by pulling a tab, for example, coupled to the atmospheric pressure seal (110). Other mechanical devices within a printing device, for example, may be used to automatically remove the atmospheric pressure seal (110) from the print material exit (415).

The print toner cartridge (100) of FIG. 4 may also include an atmospheric reduction device (425). In the example shown in FIG. 4, the atmospheric reduction device (425) is a one-way valve that fluidically couples the interior of the hopper (105) to atmosphere. In this example, in order to reduce the pressure within the hopper (105), a vacuum device may be coupled to the one-way valve and pull an amount of air out of the interior of the hopper (105). In this example, the print material is present within the hopper (105) and the atmospheric pressure seal (110) has been placed over the print material exit (415) to prevent air from entering the hopper (105).

Figure 5:
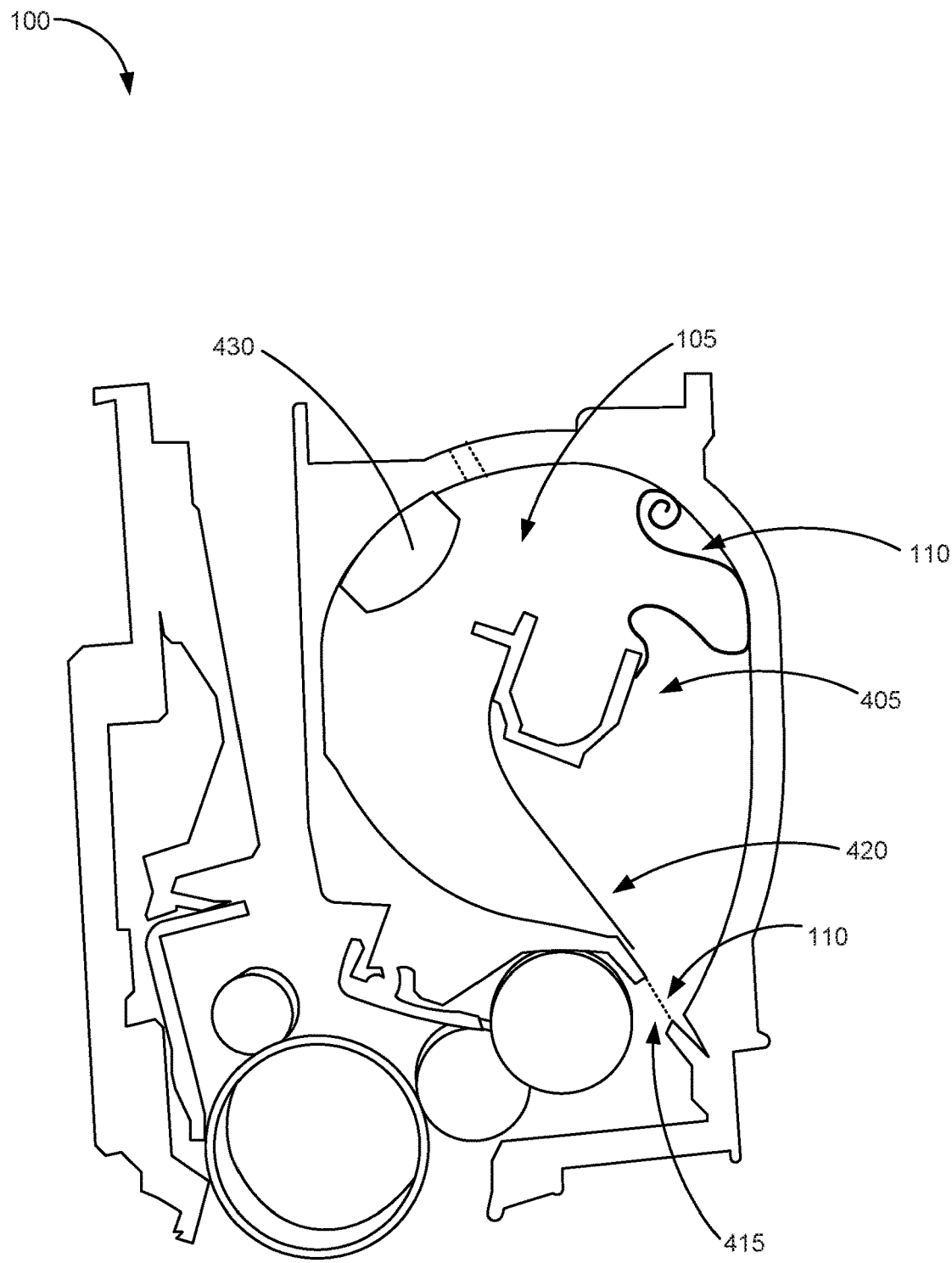
FIG. 5 is a side cutout view of a print material cartridge according to an example of the principles described herein.

FIG. 5 is a side cutout view of a print toner cartridge (100) according to an example of the principles described herein. In this example, the atmospheric reduction device (425) is a movable wall (430) or a portion of a wall as described herein. In this example and in order to create a pressure within the hopper (105), the hopper (105) may be sealed using the atmospheric pressure seal (110) on the print material exit (415) with the print material inside the hopper (105). When the atmospheric pressure seal (110) is in place, the movable wall (430) may be moved so as to increase the interior volume of the hopper (105). This causes the pressure within the hopper (105) to be reduced lower than atmospheric pressure outside the print toner cartridge (100). The reduction in pressure within the hopper (105) may be dependent on the size and/or movable distance of the movable wall (430). In an example, the movable wall (430) may be made of the same material as that of the print toner cartridge (100) and may be moved into a portion of the print toner cartridge (100) in order to increase the interior volume of the hopper (105). In an example, the movable wall (430) is a deflatable bladder that may be evacuated of air when the interior pressure within the hopper (105) is to be reduced in order to create the lower pressure within the hopper (105).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor of printing device or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a hopper or print material reservoir within a print material cartridge that is maintained under a lower pressure than atmosphere and, in some examples, away from any humidity present in the atmosphere. In this example, the print material reservoir may be sealed using an atmospheric pressure seal located at a print material exit. When the atmospheric pressure seal is removed an inrush of air into the print material reservoir causes any clumps of print material to be broken up prior to a printing process being executed by a printing device. Because of the clumping of the print material that may occur during transport of the print material cartridge, the inrush of air as described herein prepares the print material cartridge for immediate use by the printing device. This prevents the user from having to interact with the print material cartridge via a shaking of the print material cartridge in order to break up any potential clumps of print material.

The preceding description has been presented to illustrate and describe examples of the principles described. This description is not intended to be exhaustive or to limit these principles to any precise form disclosed. Many modifications and variations are possible in light of the above teaching.

What is claimed is:

1. A print powder cartridge, comprising:
   a hopper to maintain an amount of print powder therein; and
   an atmospheric pressure seal to seal the hopper from atmosphere;
   wherein a pressure within the hopper and sealed by the atmospheric pressure seal is lower than atmosphere, and
   wherein a removal of the atmospheric pressure seal is to cause an airflow from the atmosphere into the hopper.

2. The print powder cartridge of claim 1, wherein the atmospheric pressure seal is removed after insertion of the print powder cartridge into a printing device.

3. The print powder cartridge of claim 1, wherein the airflow from the atmosphere into the hopper causes clumps of print powder to be broken up.

4. The print powder cartridge of claim 1, comprising a check valve to remove air from inside the hopper.

5. The print powder cartridge of claim 1, comprising a movable wall that may increase the internal area of the hopper after additional of the print powder therein so as to create the lower-than-atmosphere pressure therein.

6. The print powder cartridge of claim 1, wherein the print powder is a toner.

7. A method of aerating a print powder, comprising:
   creating a below-atmosphere pressure within a print powder reservoir of a print cartridge;

sealing the print powder reservoir with a seal; and removing the seal to cause an airflow from the atmosphere to aerate a print powder maintained within the print powder reservoir.

8. The method of claim 7, wherein the removing of the seal occurs when the print cartridge is coupled to a printing device.

9. The method of claim 7, wherein the removing of the seal creates an airflow past the seal and into the print powder reservoir.

10. The method of claim 7, wherein creating a below-atmosphere pressure within a print powder reservoir of a print cartridge comprises:

placing the print cartridge in a vacuum chamber;

reducing the atmospheric pressure within the vacuum chamber; and placing the print powder within the print material reservoir before sealing the print powder reservoir with a seal.

11. The method of claim 7, wherein creating a below-atmosphere pressure within a print powder reservoir of a print cartridge comprises pumping an amount of air from within the print powder reservoir.

12. The method of claim 7, wherein creating a below-atmosphere pressure within a print powder reservoir of a print cartridge comprises:

reducing the internal volumetric area within the print powder reservoir;

placing the print powder within the print powder reservoir before sealing the print powder reservoir with a seal; and increasing the internal volumetric area within the print powder reservoir.

13. The method of claim 12, wherein the internal volumetric area within the print powder reservoir is accomplished by moving a portion of a wall within print powder reservoir.

14. A print toner cartridge, comprising:

a print toner reservoir to receive an amount of powder toner therein;

a seal to seal the print toner reservoir from atmosphere; and an atmospheric reduction device to reduce the atmospheric pressure within the print toner reservoir after the seal has sealed the toner within the print toner reservoir, wherein a removal of the seal is to cause an airflow from the atmosphere into the print toner reservoir.

15. The print toner cartridge of claim 14, wherein the atmospheric reduction device is a hand pump.

* * * * *